W. C. ZELLE.
LOADING MACHINE.
APPLICATION FILED MAY 19, 1911.
1,005,494.
Patented Oct. 10, 1911.
11 SHEETS—SHEET 8.
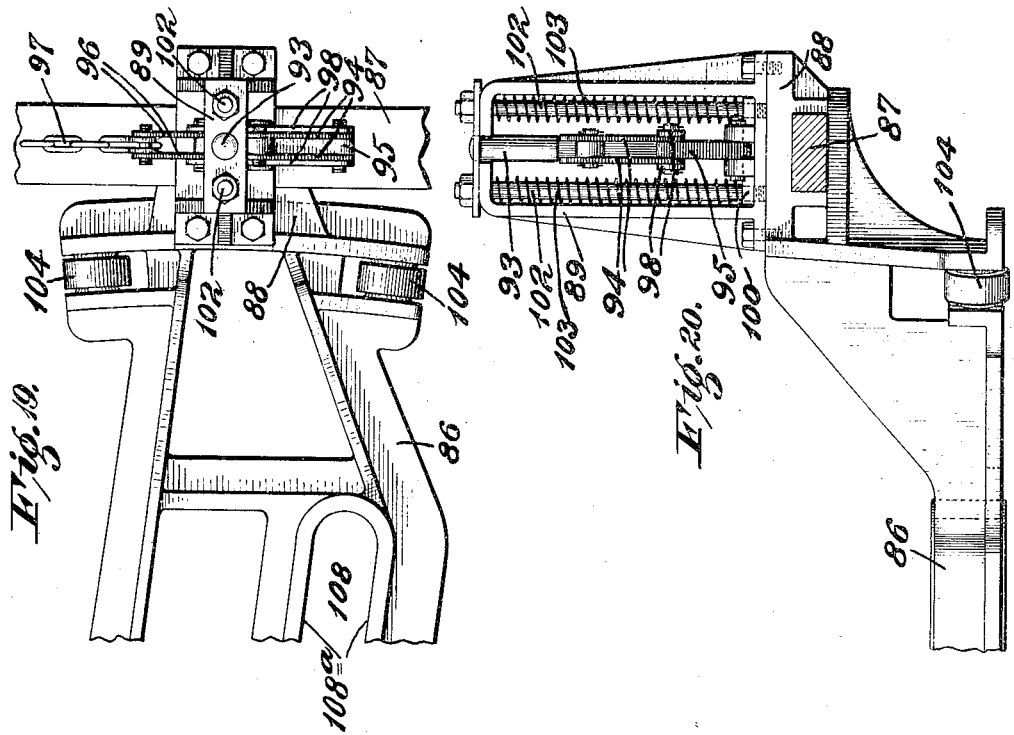
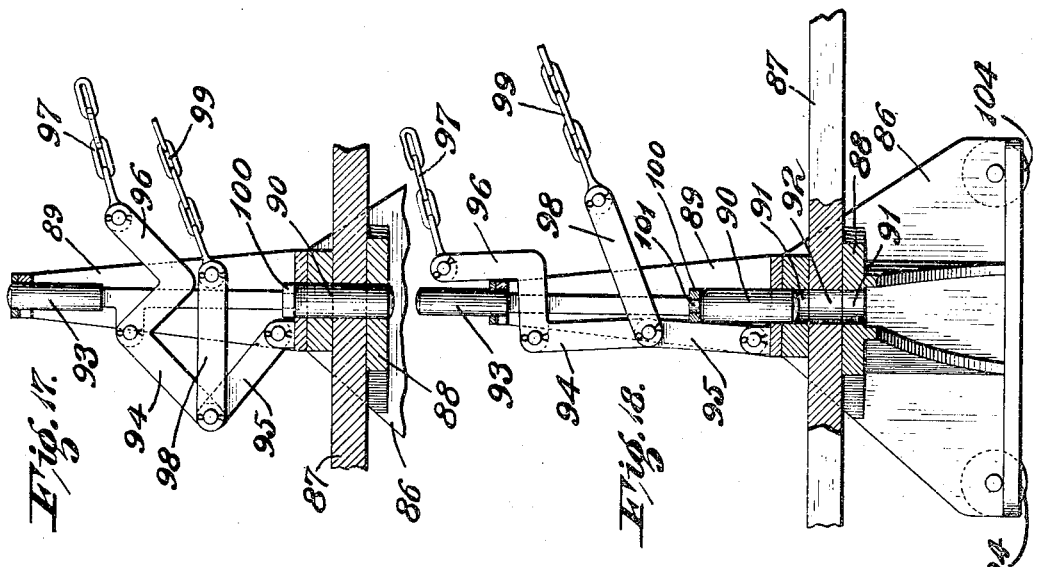
Witnesses:
Edgar T. Farmer
G. A. Pennington
Inventor:
William C. Zelle,
By Court & Court,
his Attys.

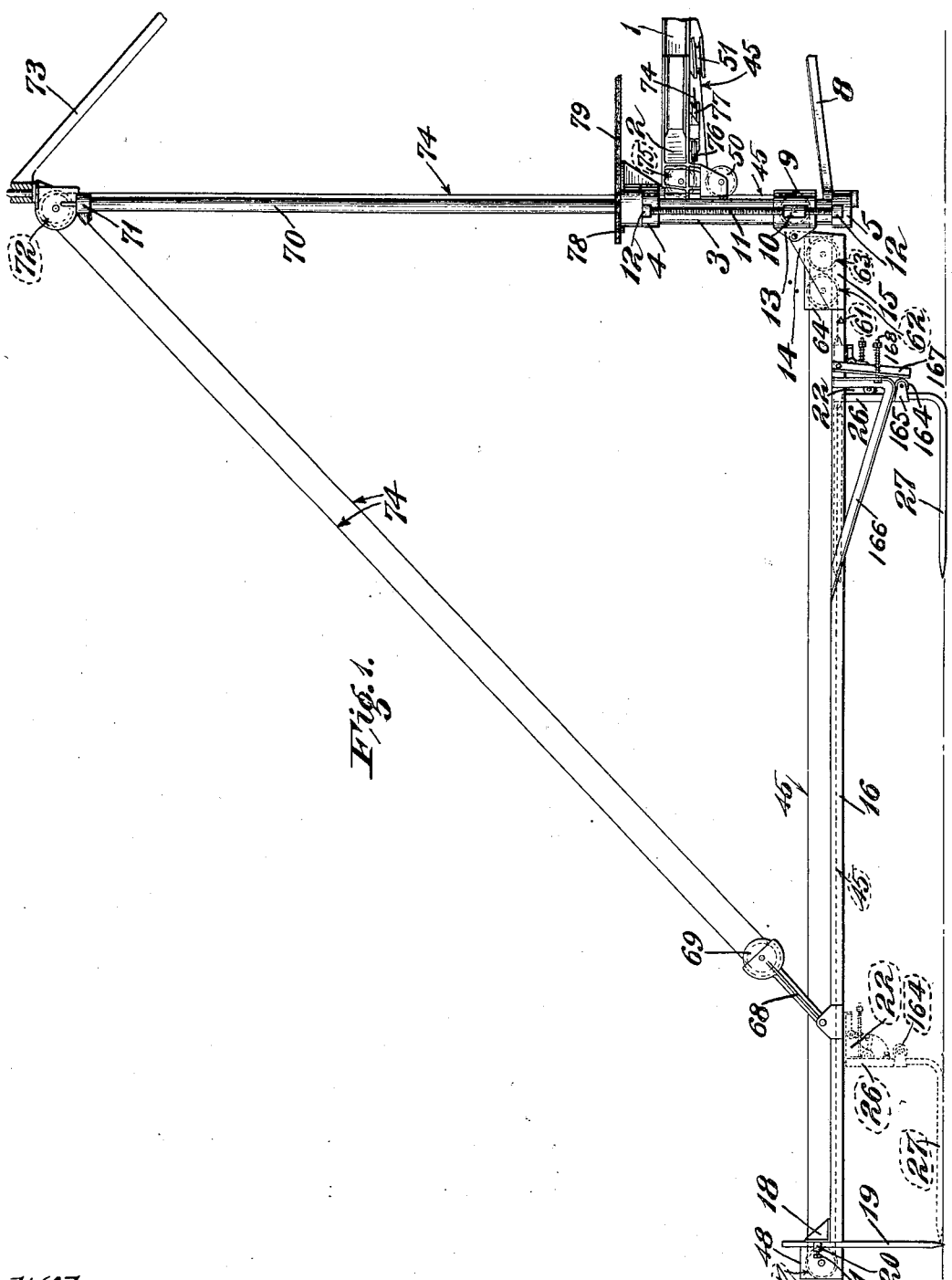

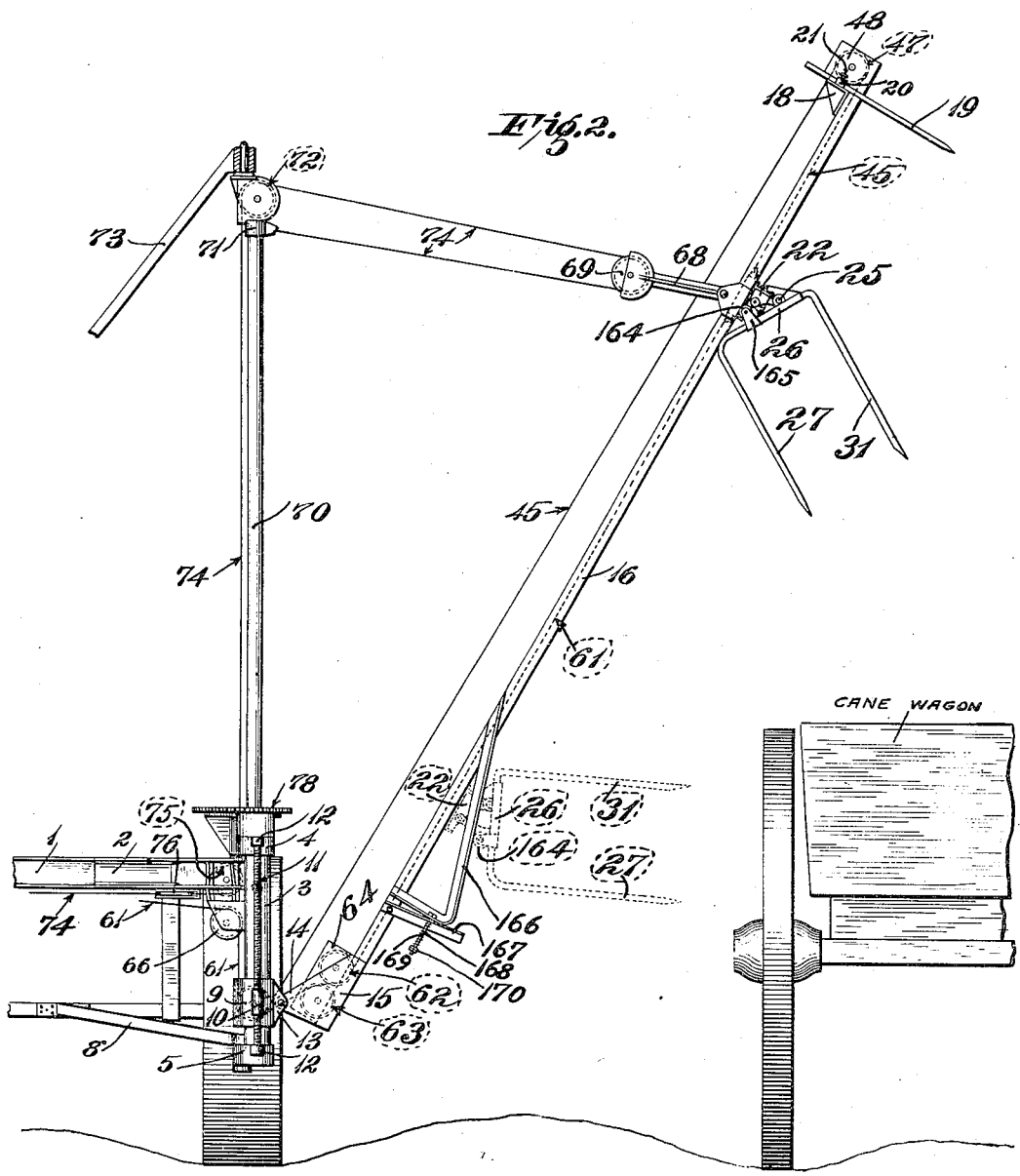

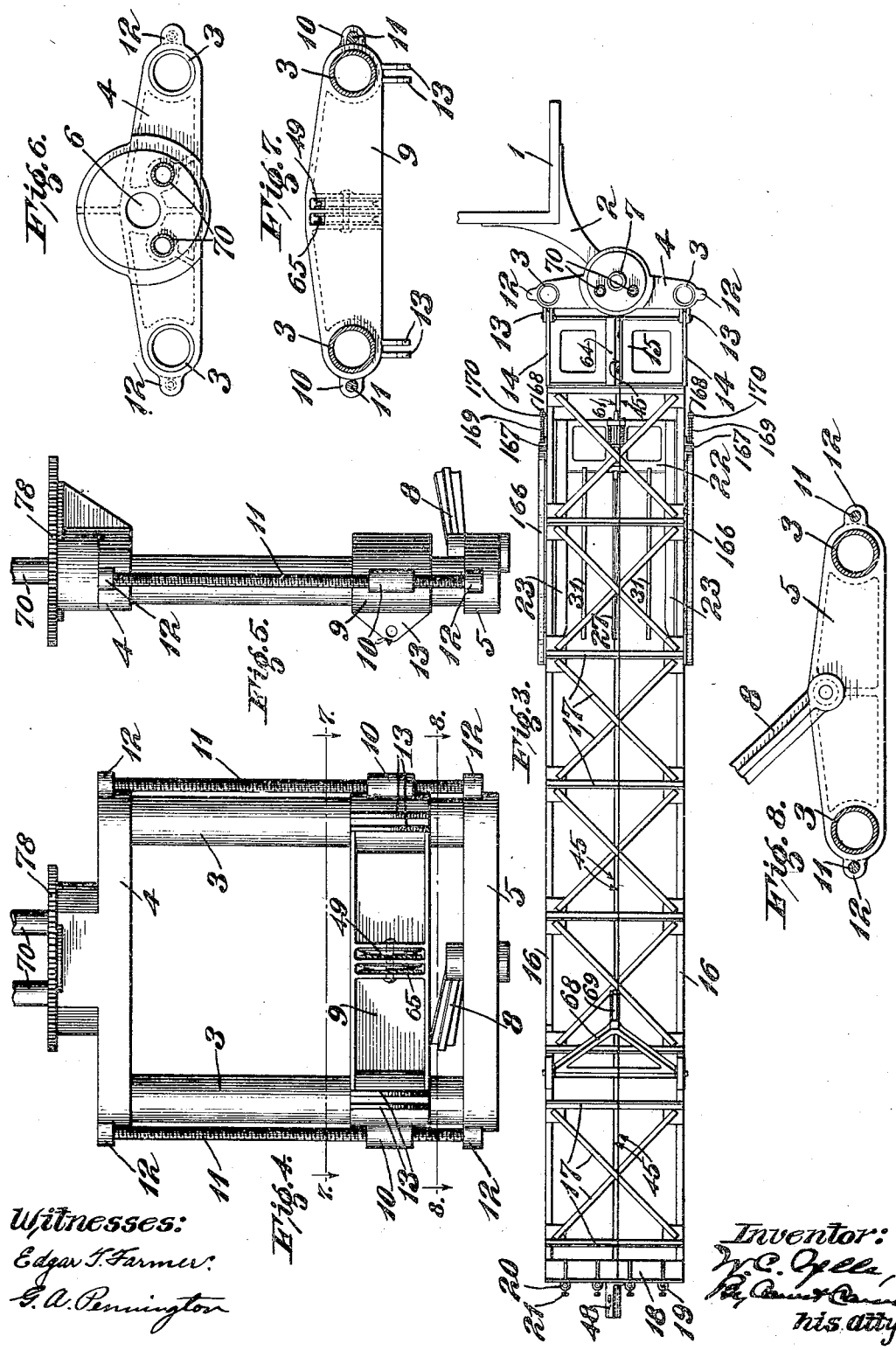

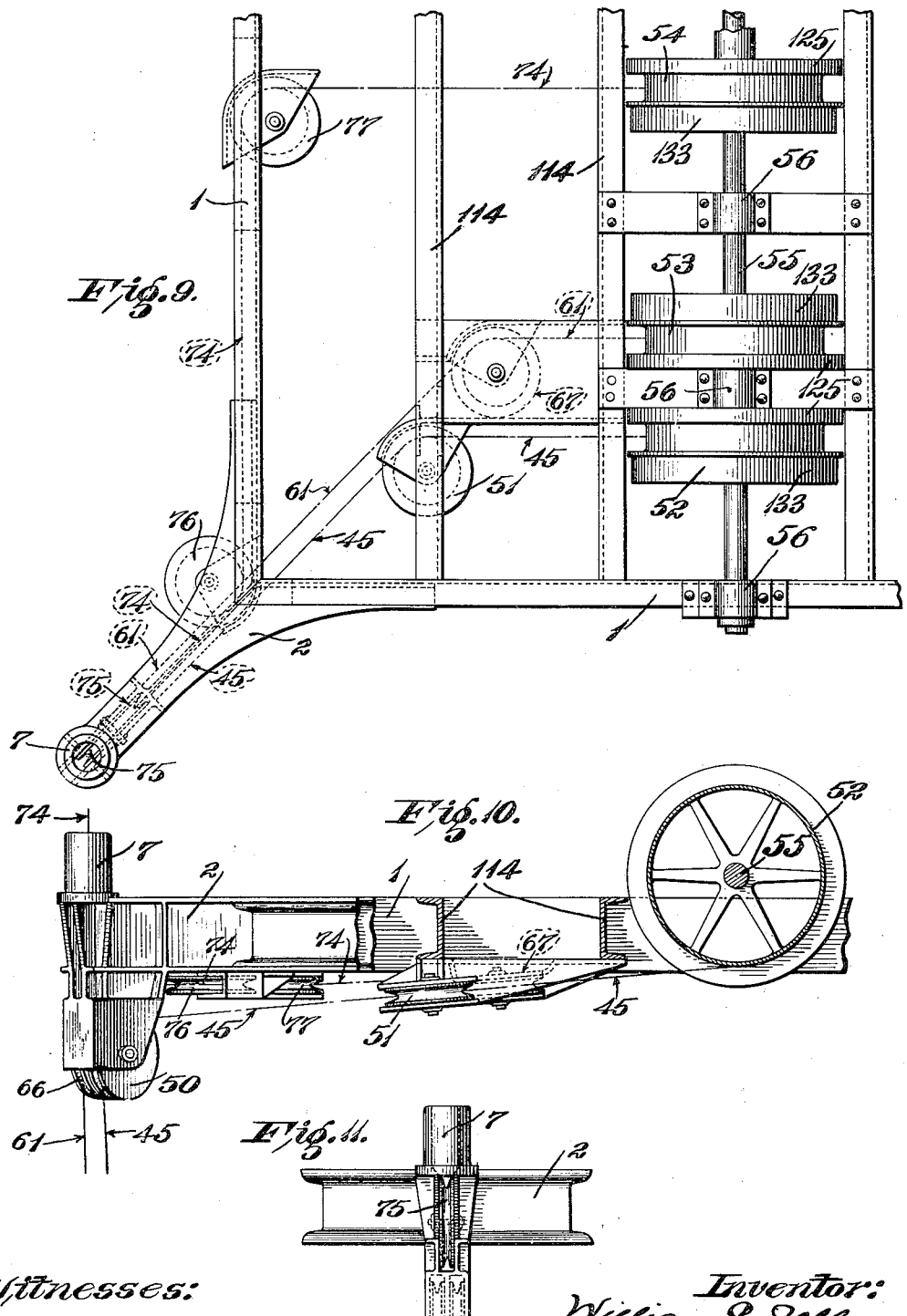

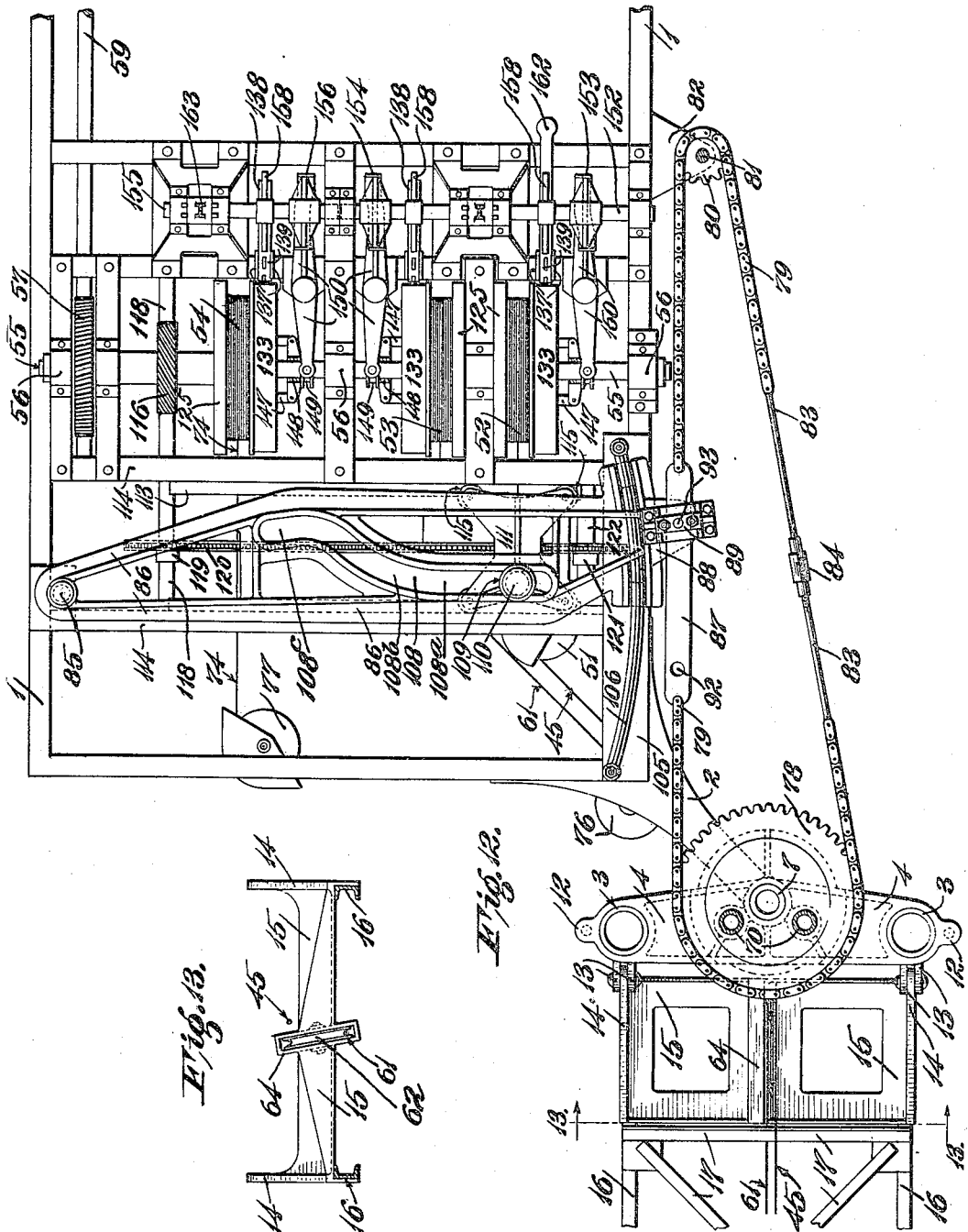

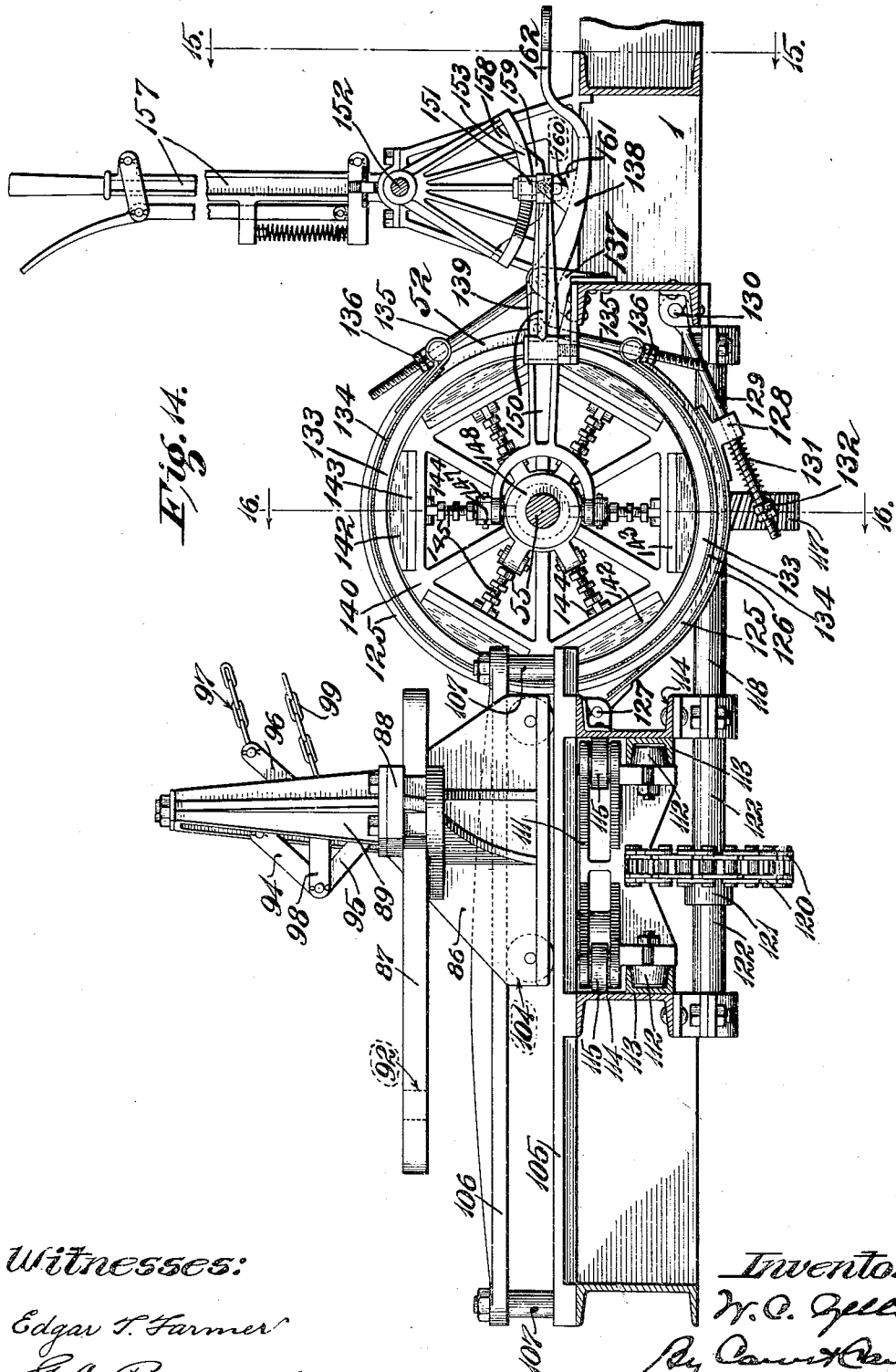

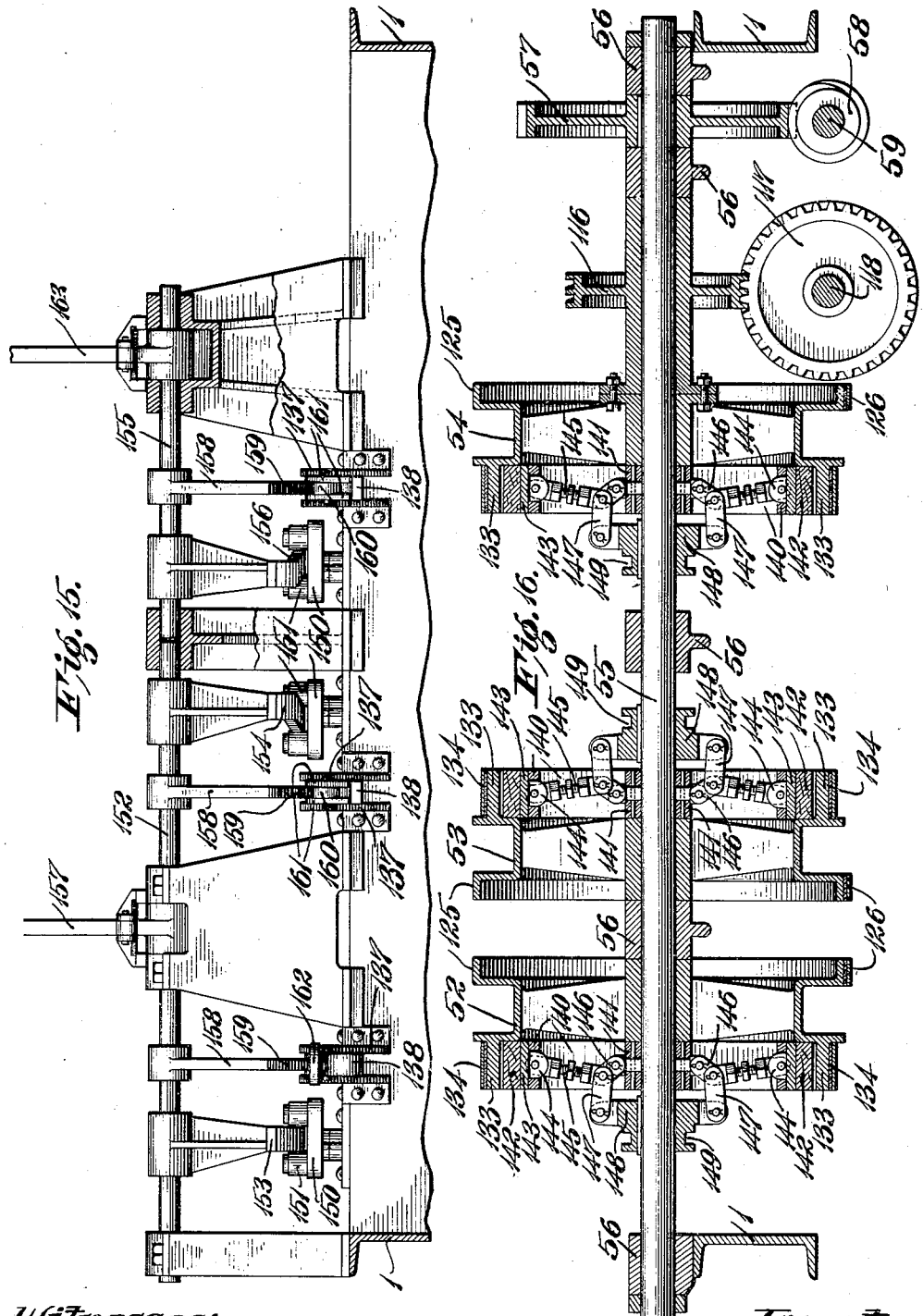

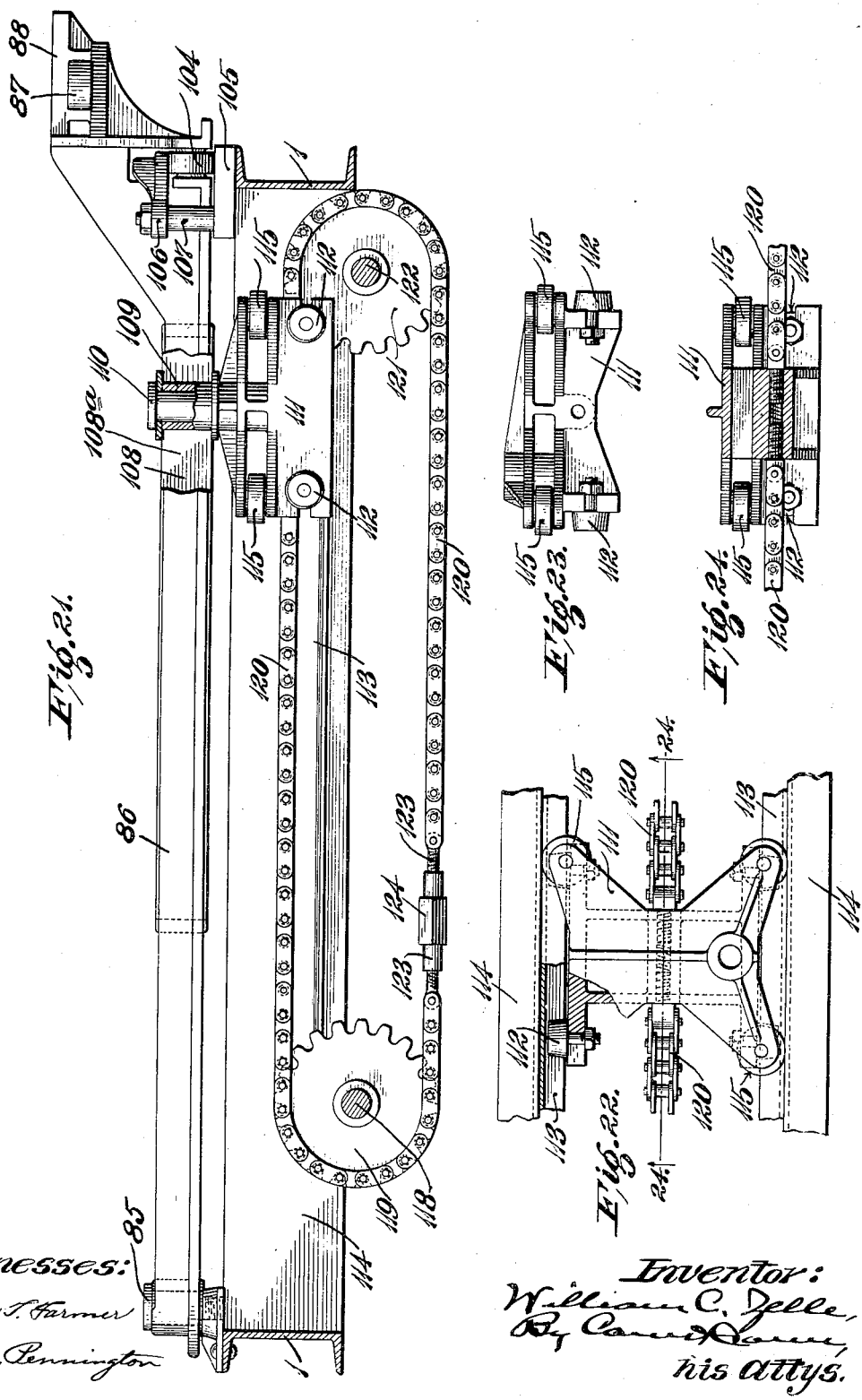

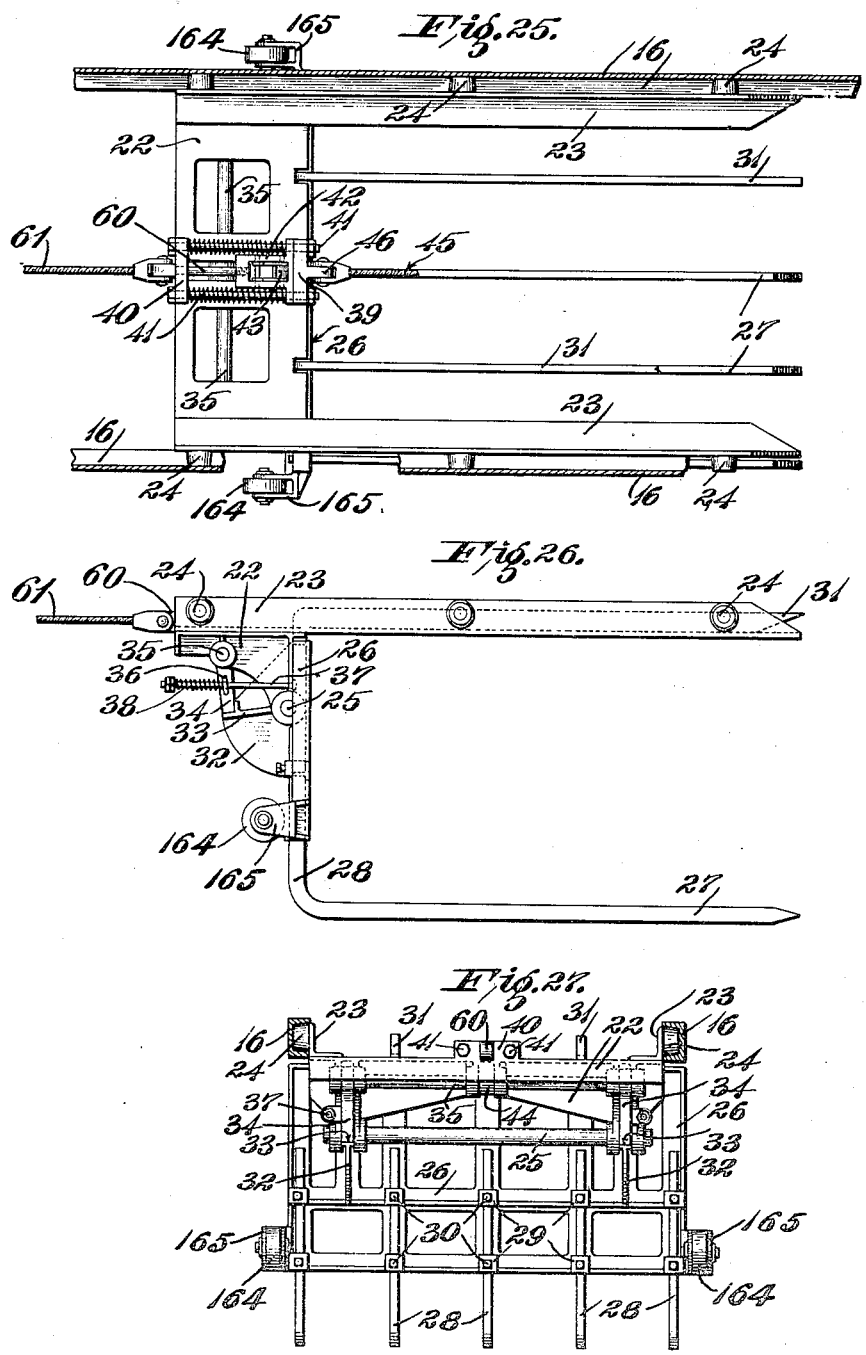

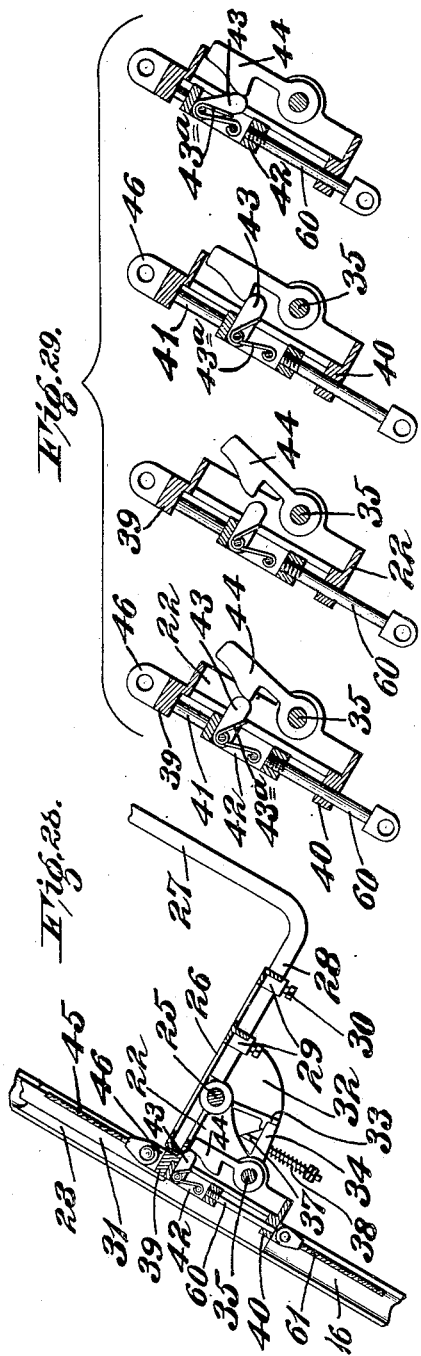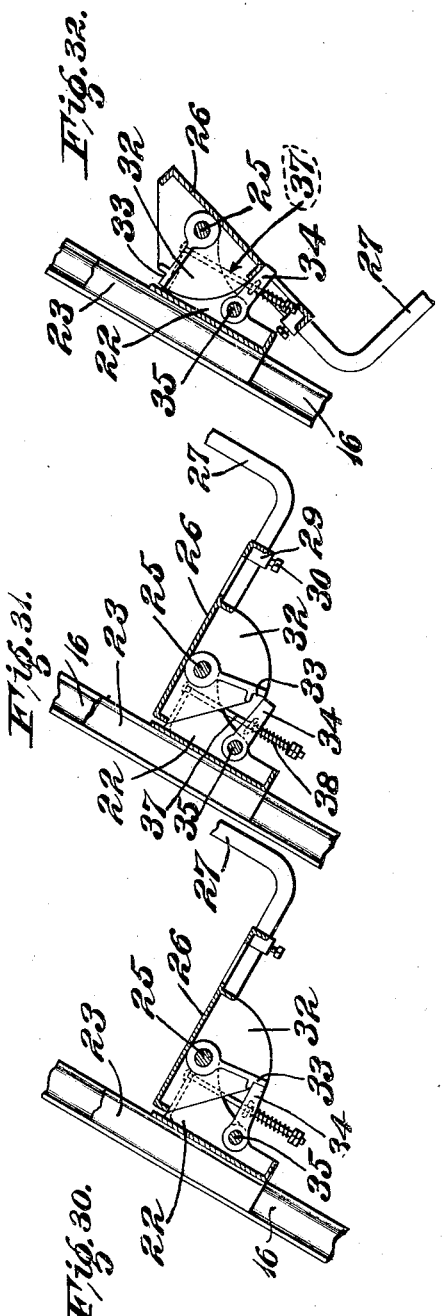

UNITED STATES PATENT OFFICE.

WILLIAM C. ZELLE, OF ST. LOUIS, MISSOURI.

LOADING-MACHINE.

1,005,494. Specification of Letters Patent. Patented Oct. 10, 1911.

Application filed May 19, 1911. Serial No. 628,307.

*To all whom it may concern:*

Be it known that I, WILLIAM C. ZELLE, a citizen of the United States, and a resident of the city of St. Louis and State of Missouri, have invented a new and useful Improvement in Loading-Machines, of which the following is a specification.

This invention relates to loading machines and more particularly to portable machines for harvesting and loading sugar cane and the like.

It has for its principal objects to produce a machine of light and simple construction and easy manipulation, which will minimize the labor and expense of harvesting sugar cane and the like and possesses certain other advantages hereinafter more fully appearing.

The invention consists in the parts and in the arrangements and combinations of parts hereinafter described and claimed.

In the accompanying drawings which form part of this specification and wherein like symbols refer to like parts wherever they occur,—Figure 1 is a view showing a fragment of the front portion of the carriage frame or platform in side elevation and an elevation of the mast and boom frame which carries the gathering fork, the latter being in "gathering position"; Fig. 2 is a front elevation of the portion of the carriage frame or platform shown in Fig. 1, the mast being turned at right angles and the boom frame being hoisted with the gathering fork in dumping position over a cart or wagon; Fig. 3 is a top plan view of the boom frame and swiveled supporting frame therefor; Fig. 4 is an enlarged front elevation of the swiveled supporting frame; Fig. 5 is a side view of the latter; Fig. 6 is a top plan view of the same; Fig. 7 is a horizontal section on the line 7—7 of Fig. 4; Fig. 8 is a section on the line 8—8 of Fig. 4; Fig. 9 is a fragmentary plan view of the carriage frame or platform, the hoisting drums being shown without the mechanism which coöperates directly therewith, the view also showing the supporting bracket for the swiveled frame which carries the boom frame and mast and also showing the arrangement of the guide pulleys for the several operating ropes; Fig. 10 is a side elevation of the parts shown in Fig. 9; Fig. 11 is an end elevation of the supporting bracket for the swiveled supporting frame for the boom frame and mast; Fig. 12 is a view similar to Fig. 9, showing the swiveled supporting frame, a portion of the boom frame, the actuating devices therefor, and the controlling devices for the respective winding drums; Fig. 13 is a section through the boom frame taken on or about the line 13—13 of Fig. 12; Fig. 14 is an enlarged view, partly in vertical section and partly in elevation, showing the controlling devices for the winding drums and also a part of the mechanism for turning the mast; Fig. 15 is a section taken on or about the line 15—15 of Fig. 14; Fig. 16 is a section taken on or about the line 16—16 of Fig. 14; Figs. 17, 18, 19 and 20 are enlarged detailed views of the latch device which is a part of the boom-swinging mechanism; Fig. 21 is an enlarged transverse section through the carriage frame showing the cam-lever and associated mechanism for turning the swiveled supporting frame for the boom frame and mast; Fig. 22 is an enlarged fragmentary view, partly in plan and partly in horizontal section, showing the carriage which coöperates with the cam-lever of the turning mechanism for the swiveled supporting frame; Fig. 23 is an end view of the carriage illustrated in Fig. 22; Fig. 24 is a section taken on or about the line 24—24 of Fig. 22; Fig. 25 is an enlarged view showing the gathering fork in top plan and fragments of the boom frame; Fig. 26 is a side elevation of the gathering fork; Fig. 27 is a rear elevation of the latter; Fig. 28 is a fragmentary view, partly in section and partly in elevation, showing the boom in raised position and the gathering fork in its position prior to being dumped; Fig. 29 is a view showing the action of the tripping latch mechanism for the gathering fork; and Figs. 30, 31 and 32 are views showing the action of the releasable locking mechanism for the gathering fork.

The machine may be mounted on any suitable and portable platform or carriage. The wheels may be of any suitable traction type and the machine may be driven by a gasolene or other desirable motor (not shown). In practice the same motor may obviously be utilized for propelling the machine as well as actuating the gathering and loading mechanism. Hence, in the drawings only the driving shaft of the motor is shown.

The gage between the centers of the traction wheels is preferably the same as the distance between the centers of two adjoining furrows so that the wheels may straddle a hill and travel on the bottoms of the furrows; and the mast and boom, hereinafter more fully set forth, are arranged so that the boom may be lowered and carried lengthwise directly over a furrow; preferably, the furrow along which the wheels at one side of the machine travel.

Preferably, for convenience in harvesting, to facilitate handling and loading, and to minimize the cost thereof, the canes or stalks cut from three adjacent hills or rows are laid and heaped in a single row crosswise of the furrow between two adjacent hills, so that throughout the field the cut canes will be symmetrically arranged crosswise in parallel rows with a space of two open furrows and one unoccupied hill between every row. This arrangement permits the passage of the cane cart or wagon lengthwise of the unoccupied furrows and also permits of the progressive travel of the loading machine without disturbing the heap rows adjacent to the one being gathered and loaded.

As shown in the drawings, the carriage or platform comprises an open structural frame 1 built from channels and angle sections. It may be mounted on any suitable running gear (not shown) and propelled in any suitable manner.

Supported on a corner bracket or extension 2 of the carriage or platform 1 is a swiveled frame comprising parallel vertical members 3 and top and bottom cross members 4 and 5, respectively. The upper cross member 4 is provided with a vertical opening 6 at its middle which rotatably fits a cylindrical stud 7 having a vertical bore on the outer end of the corner bracket 2. The lower cross member 5 is hingedly connected, at a point axially under the opening 6 of the upper cross member 4 and bore of the stud 7, to one end portion of a stay member or brace 8 which is attached at its opposite end to a rigid part of the carriage frame.

A vertically movable cross member 9 has its opposite end portions sleeved over the vertical members 3 of the swiveled frame; and projecting from the opposite ends of said cross member 9 are lugs 10 which are bored and screw-threaded to fit vertical supporting and adjusting screws 11 extending parallel with said vertical members 3. These screws are swiveled or journaled at their opposite ends in lugs 12 projecting from the ends of the upper and lower cross members 4 and 5. By turning the screws in their bearings 12 the cross member 9 may be raised and lowered, as desirable.

The cross member 9 is provided with forwardly projecting ears 13 arranged, preferably, in pairs near its opposite ends; and hinged between these ears 13 are upstanding ears 14 of an end casting or cross member 15 to which a boom frame is secured. The boom frame comprises channel side members 16 whose flanges are disposed inwardly; and the top flanges are connected by transverse and diagonal cross braces 17. The front end portions of the members 16 are connected to an end casting or cross member 18; and secured to the member 18 is a series of fingers 19 constituting an abutment to coöperate with a gathering device or fork which is mounted on the boom frame so as to travel lengthwise thereof. These fingers 19 are preferably slidably fitted through perforations in lugs 20 on said end member 18 and secured by set screws 21 so that they may be adjusted.

The gathering device or fork, as shown more clearly in Figs. 25 to 27, inclusive, comprises a cross member or casting 22 which has rigidly secured thereon forwardly projecting angle members 23 whose vertical flanges are disposed parallel with the web of the adjacent boom channel members 16 and have journaled thereon rollers 24 which travel in said channels. Hinged to the member 22, as by a shaft 25, is a frame or casting 26 which has a series of forwardly projecting forks 27 secured to the lower portion thereof. These forks 27 have their rear end portions 28 bent up at right angles and slidably fitted through openings in lugs 29 on the frame 26 and secured by set screws 30, so that said forks may be adjusted. Extending forwardly from the upper portion of the frame 26 is a pair of forks 31 whose bottom edges are substantially in the same plane as the bottoms of the angle members 23.

Normally, the forks 27 and 31 lie parallel with the angle members 23 and the parts are held in this relation by a releasable catch mechanism or tripping device. The tripping device comprises lugs 32 projecting rearwardly from the frame 26 and having seat portions 33 adapted to be engaged by pawls 34 mounted on the under side of the cross member 22. Preferably, two of the lugs 32 are employed and located near the sides of the gathering device; and the pawls 34 are mounted fixedly on a rock-shaft 35. Each of the pawls 34 is provided with a perforated lug 36 through which is slidably fitted a bolt 37. The respective bolts 37 are secured at one end to the member 22 and the opposite ends of the bolts are provided with jam nuts; and springs 38 are sleeved on the bolts between said lugs and jam nuts. The action of the springs is to yieldingly hold the pawls 34 in engagement with the seats on the lugs 32.

Projecting upwardly from the front and rear edge portions of the member 22 are lugs 39 and 40. Mounted on these lugs are parallel guide rods 41 on which a latch block 42 slides. This latch block carries a pivoted projection 43 which is adapted to ride over a cam face on a rock-arm 44 fixed on the shaft 35. The pivoted projection 43 is yieldingly held in position by a spring 43ᵃ which presses it against a shoulder or adjacent flat face on the sliding block 42 (see Figs. 28 and 29). When the block 42 is moved rearwardly the projection 43 rides over the cam face on the arm 44 and thereby rocks the latter together with the shaft 35 and pawls 34 which are in fixed relation to each other. The pawls 34 are thereby moved out of engagement with the seats 33 of the lugs 32 on the pivotal member 26 and the gathering fork swings on the shaft 25 into dumping position (see Figs. 2 and 32).

The gathering fork is connected through a rope, hereinafter designated as the "loading rope", to a winding drum on the platform and hereinafter referred to as the "loading drum". Preferably, the "loading rope" 45 is attached to an ear 46 on the front lug 39 of the fork member 22. The rope is carried forwardly under and back over a pulley or sheave 47 journaled in a housing 48 on the end member 18 of the boom frame, thence under a pulley 49 journaled in the cross member 9 of the swiveled frame, thence up over a pulley 50, and thence rearwardly over a guide pulley 51 to the "loading drum" 52.

The "loading drum" 52 and the additional drums hereinafter referred to as the "dumping and restoring drum" 53 and "hoisting drum" 54, respectively, are mounted on a single shaft 55 for convenience in operating and controlling them. This shaft 55 extends transversely of the carriage or platform frame and is journaled in bearings 56 at its opposite ends and at intervals throughout its length. It may be driven through any suitable gearing, but, preferably, it has fixed thereon a worm-gear 57 driven by a worm-screw 58 fixed on a driving shaft 59 which is connected in any suitable manner to the motor (not shown). By this arrangement the shaft 55 may be continuously driven.

Referring back to the gathering fork, the latch block 42 is provided with a rearwardly extending bolt 60 which slides through the lug 40 on the frame member or carriage 22 and has one end of a rope, hereinafter referred to as the "tail rope" 61, secured thereto. The "tail rope" is carried rearwardly under a pulley 62, thence up over a companion pulley 63 (both of said pulleys 62 and 63 being journaled in a housing 64 on the end member 15 of the boom frame), thence rearwardly under a pulley 65 journaled adjacent to the pulley 49 in the cross member 9 on the swiveled frame, thence up over a pulley 66 journaled on the bracket arm 2 adjacent to the pulley 50, and thence rearwardly around a guide pulley 67 on the carriage frame to the "dumping and restoring drum" 53.

Pivoted to the boom frame, near its outer end, is a yoke 68 which has a pulley 69 journaled thereon. A mast comprising a pair of parallel vertical members 70, preferably tubular, is mounted on the upper cross member 4 of the swiveled frame which carries the boom frame. The upper ends of the mast members 70 are connected by a cross member, preferably a casting 71 having a housing in which a pulley 72 is journaled. The mast may be braced by diagonal stays 73 which are secured to the carriage or platform frame in any obvious manner.

A rope hereinafter referred to as the "hoisting rope" 74 is secured at one end to the cross member 71 at the top of the mast. It is then carried under and around the pulley 69 on the swiveled yoke 68, thence up over the pulley 72 at the top of the mast, thence down through a central opening in the pivot stud 7 which is fitted into the opening 6 in the cross member 4 of the swiveled frame, thence under a pulley 75 journaled in the bracket arm 2 above the two pulleys 50 and 66, and thence rearwardly and laterally over guide pulleys 76 and 77 on the carriage or platform frame to the "hoisting drum" 54.

It is here noted that the respective controlling ropes pass vertically in line with the axis of the swiveled frame which carries the boom frame and mast or in close proximity thereto, so that the frame may swing without interference and undue strain on the ropes. So, too, the "tail rope" 61 is carried under and over the respective pulleys 62 and 63 before being passed under the pulley 65, in order to bring the rope close to the pivot of the boom to prevent breaking the rope when the boom is swung up and down.

A sprocket wheel 78 is fixed on the cross head 4 concentric with the axis of the swiveled frame; and this sprocket wheel 78 is connected through a sprocket chain 79 to a similar gear 80 fixed to a shaft 81 (see Fig. 12). This shaft is preferably journaled in a bracket 82 at the side of the machine and, in practice, extends upwardly and is provided with a handwheel or lever (not shown) in convenient reach of the operator. It is preferable to split the chain and provide link members 83 which are connected by a turnbuckle 84 so that the slack in the chain may be taken up.

Pivoted, as at 85, at the side of the carriage frame opposite to that on which the boom is mounted, is a cam lever or oscillatory member 86 which extends transversely across the frame and is secured to the sprocket chain 79. The connection between the lever 86 and sprocket chain is preferably effected through the devices shown and presently described. The sprocket chain is provided with a flat bar or elongated plate 87 which slides through a horizontal opening in a bracket-extension 88 on the end of the lever 86. A yoke or frame 89 is secured on this bracket extension 88. In the yoke is mounted a vertically movable latch-bolt 90 which slides through openings 91 in the bracket extension 88 and any one of a pair or series of openings 92 in the bar 87 which is brought into register with said openings 91.

The upper end portion 93 of the bolt 90 works through a perforation in the top of the yoke 89 while the intermediate portion of the bolt is preferably reduced and square in cross section. A toggle comprising upper and lower members 94 and 95 is connected to the bolt and the bottom of the yoke 89. The upper toggle member 94 is provided with a bell crank extension 96 to which is attached a manipulating chain 97; and a link 98 is pivotally connected to the knuckle of the toggle and has a manipulating chain 99 attached thereto.

The chains 97 and 99 may be carried to any convenient point in reach of the operator. Preferably, the toggle element 95 is a single member while the element 94 comprises a pair of like members which straddle the reduced intermediate portion of the bolt 90; and the element 98 also preferably comprises a pair of members. The toggle is so arranged that, when the chain 99 is pulled, the elements 94 and 95 are straightened and moved past center and the bolt 90 is raised and held from dropping back into the opening 92 in the bar 87. To restore the bolt to locking position, the chain 97 is pulled to bend the toggle. Preferably, the bolt has a cross member 100 which is perforated at opposite ends, as at 101, to slidably fit guide rods 102 extending parallel with the bolt in the yoke 89. Springs 103 are sleeved over these guide rods and interposed between the top of the yoke 89 and said cross member 100, so as to yieldingly hold the bolt in locking position.

The cam lever or oscillatory member 86 is provided with rollers 104 which ride on a track-plate 105 on the carriage frame; and an arcuate retaining piece 106 is secured at its opposite ends on studs 107 projecting upwardly from said track-plate 105. This retaining piece 106 coöperates with the rollers 104 to prevent the free end of the cam lever from jumping.

The lever 86 is provided with a cam groove 108 in which fits an anti-friction sleeve 109 on a stud 110 extending upwardly from a carriage 111. This carriage 111 is provided with bearing rollers 112 which travel in channeled trackways 113 mounted on the inner faces of a pair of parallel cross beams 114. The carriage is also provided with a set of lateral thrust rollers 115 adapted to bear against the inner faces of said cross beams 114. When the carriage 111 is reciprocated on its trackways, the cam lever is oscillated on its pivot, and owing to the connection between the cam lever and sprocket chain 79, the swiveled frame which carries the boom and mast is rotated.

Preferably, the actuating mechanism for the carriage 111 is operated simultaneously with the hoisting drum 54, so that the boom is swung laterally at the same time it is being raised and lowered. Therefore, a spiral gear 116 is fixed to rotate with the winding drum 54. That is, the gear is fixed to a sleeve which is loose on the shaft 55 but bolted to the hub portion of said drum 54. The spiral gear 116 meshes with a second spiral gear 117 fixed to a countershaft 118 which has a sprocket wheel 119 fixed thereon. A sprocket chain 120 is secured at its opposite ends to the middle portion of the carriage 111 and is looped around said sprocket wheel 119 and a second sprocket wheel 121 mounted on a shaft 122. The sprocket chain 120 is preferably split and provided with screw-threaded link members 123 which are connected by a turnbuckle 124.

Each of the winding drums is provided with a flanged portion 125 with whose peripheral face a retarding brake, comprising a strap 126, coöperates. The respective straps 126 are fixedly supported at one end, as at 127, and they are provided at their opposite ends with perforated lugs 128 through which bolts 129 are slidably fitted. The bolts are fixedly supported at one end, as at 130, and springs 131 are sleeved on said bolts between the lugs 128 and jam nuts 132 which are threaded onto the free end portions of said bolts. By adjusting the nuts 132 on the bolts, the tension of the springs may be varied to produce the desired friction between the straps 126 and the peripheral faces of the flanges 125 on the drums. In practice, the retarding brakes are adjusted so that the drums may be readily rotated when the clutches, presently described, are thrown into engagement therewith, but will offer sufficient resistance to hold said drums from rotating or overtraveling when the clutches are thrown off.

Each of the winding drums is provided with a second brake flange 133 with whose peripheral face a brake-band 134 coöperates. The opposite ends of the respective brake-bands 134 slidably engage bolts 135 whose outer end portions are screw-threaded to receive jam nuts 136. The inner end of one of the bolts 135 is pivotally connected to the supporting bracket 137 for an actuating lever 138. The other bolt 135 is pivotally connected at its inner end to an extension 139 of said lever 138. By this arrangement, when the lever is depressed, the brake-band 134 is wrapped tight against the peripheral face of the flange 133.

Preferably, the clutches for the respective winding drums each comprise a spider frame 140 whose hub portion 141 is fixedly keyed on the shaft 55. The spider 140 has a multiplicity of peripheral notches or pockets in which segmental brake shoes or blocks 142 are loosely seated. The blocks 142 are secured to flat plates 143 having lugs 144 which work through openings in the spider frame and are pivotally attached to toggle members 145. Short toggle members 146 are pivoted to the members 145 and to the hub portion 141 of the spider; and the knuckles of the respective toggles are connected by links 147 to clutch sleeves 148 which are feather-keyed on the shaft 55. The clutch sleeves are provided with annular grooves 149 with which studs or rollers on the forked end portions of horizontal shifting levers 150 coöperate. The levers 150 are provided at their other ends with lateral extensions on which rollers 151 are journaled, there being a pair of these rollers on each lever.

Fixed on a transverse rock-shaft 152 are cam sectors 153 and 154; and on a second rock-shaft 155 in line therewith, is fixed a cam sector 156. The cam sector 153 coöperates with the lever for the "loading drum" and the sector 154 coöperates with the lever for the "restoring and dumping drum." These sectors are fixed on the same rock-shaft and are operated by a single lever 157 fixed to the shaft for the reason that said drums work in correlation to each other. That is, when one drum is winding, the other should be unwinding. Therefore, the cam faces of the sectors 153 and 154 are the reverse of each other.

When the lever 157 is thrown forwardly, the offset or cam portion of the sector 153 rocks the coöperating clutch lever 150 and throws the clutch in on the "loading drum" 52, while the straight portion of the sector 154 rides between the rollers on the clutch lever for the "restoring and dumping drum" 53 and holds the clutch from engagement with the latter. Hence, the drum 52 winds the "loading rope" thereon and pulls the gathering fork forwardly on the boom frame; and the "tail rope" is played out from the drum 53 which is merely resisted by the retarding band 126, the resistance being sufficient to hold the "tail rope" taut. On the other hand, when the controlling lever 157 is moved rearwardly, the clutch for the "loading drum" 52 is thrown off and the clutch for the "restoring and dumping drum" 53 is thrown in. In this case, the "tail rope" is wound on the drum 53 and the "loading rope" is played out from the drum 52.

As the "tail rope" is wound on the drum 53, the catch for the gathering fork is tripped and the latter is dumped; and a continued winding of the drum 53 restores the fork to normal position at the inner end of the boom frame. As the fork is drawn rearwardly on the boom frame, it is, of course, in dumped position. To right it or restore it to gathering position, rollers 164 are journaled in brackets 165 on opposite sides of the fork. These rollers are arranged to ride down cam tracks 166 secured to the opposite boom frame channels 16. That is, the fork is substantially in the position shown by full lines in Fig. 2, when dumped, and is restored as shown by dotted lines in said Fig. 2, preparatory to lowering the boom frame. As soon as the fork is righted, the catch hereinbefore mentioned, holds it in place. Resilient stops comprising pivoted levers 167 are mounted on the boom frame members 16 at the rear of the cam tracks 166, so as to form yielding abutments against which the rollers 164 contact. These levers 167 are preferably pieces of angle iron and one of their flanges is perforated to permit a bolt 168 to slide therethrough. The bolt is secured at one end to the cam track member and has a spring 169 sleeved thereon between the stop lever or abutment and the adjusting nut or collar 170 at the opposite end of the bolt.

Preferably, the same controlling lever 157 which operates the cam sectors 153, 154, also operates the band-brakes 134 for the drums 52 and 53. This is accomplished by fixing on the shaft 152 sectors 158 having cam projections 159 on their bottom edges which coöperate with rollers 160 journaled between lugs 161 on the respective brake-levers 138. The cam projections 159 are arranged so that, when the operating lever 157 is in vertical or neutral position, the brake-levers are depressed and the brake-bands 134 are drawn into contact with the peripheral faces of the flanges 133 on both of the drums 52 and 53; and when the operating lever is moved to throw on either of the clutches, the brakes for both of the drums 52 and 53 are thrown off. That is, the two drums, as above set forth, are free to rotate, excepting the retarding action of the straps 126. However, when it is desired to dump the gathering fork, the brake 134 has to be momentarily thrown on the "loading drum" as the "tail rope" is pulled by the winding of the drum 53 so that the springs which hold the tripping block will yield to permit the tripping member on the block to actuate the catch which holds the fork in gathering position.

Obviously, the springs which yieldingly hold and restore the latch block must be strong enough to normally overcome the resistance of the retarding band on the "loading drum." Hence, the necessity of applying the brake momentarily on the drum 52 until the tripping of the catch for the gathering fork is effected. Therefore, it is preferable to provide an extension 162 on the lever 138 which actuates the brake for the "loading drum," so that the operator may depress the lever with his foot.

The clutch and brake for the "hoisting drum" is operated by a lever 163 fixed on the shaft 155 which is provided with a cam sector 158 like those on the shaft 152. When this lever is moved in one direction, the clutch is thrown in and the brake is thrown off. When the lever is moved in the opposite direction, the clutch is held off from the drum and the brake is released. This lever 163 controls the raising and lowering of the boom and, as hereinbefore set forth, the boom swings laterally simultaneously with the raising and lowering thereof. However, it is specially desirable and, in fact, almost a necessity that the boom be raised a considerable distance before it starts to turn laterally, in order to avoid striking the horses or mules which usually draw the cane carts or wagons and stand alongside of the boom when lowered. Therefore, the cam slot 108 in the lever 86 is provided with a straight portion 108$^a$ which extends in line with the direction of travel of the carriage 111 when the boom frame is lowered in gathering position (see Fig. 12). By this arrangement the carriage 111 travels a considerable distance after the boom frame begins to rise before the sleeve or roller 109 on the stud 110 enters the eccentric portion 108$^b$ of the slot 108 to effect the shifting of the lever 86 which swings the boom. The cam slot 108 is also provided with a straight portion 108$^c$ into which the sleeve or roller 109 moves after the boom has reached its proper lateral position. This permits the boom to be raised a little higher and allows the operator some time in which to stop the actuation of the "hoisting drum" and also obviates a jar at the end of the movement of the boom.

In the operation of the machine, the boom frame is dropped over the heap row until the abutment fingers touch the ground, or nearly so. Then the gathering fork is moved toward the abutment until a load is compressed therebetween. Then the boom frame is hoisted and swung over the cane cart or wagon and the fork is dumped. Then the gathering fork is restored and righted in normal position. Then the machine is moved forward in position to gather another load and the operations above noted are repeated, and so on throughout the field.

The several clutches which engage the respective drums are adjusted so as to hold with sufficient force to accomplish the work imposed upon them, but permit the drums to slip when the moving parts actuated thereby are arrested by undue resistance or contact with a fixed stop. For example, when the "hoisting drum" is acting to raise the boom, and the operator fails to throw off the clutch at the proper time, the carriage 111 will be arrested in its movement by reason of the roller carried thereby contacting with the end of the cam slot in the lever 86. The shoes of the clutch will then slip on the flange of the drum and thereby prevent damage to the driving mechanism. So, too, in case the operator fails to stop the "loading drum" as soon as the gathering fork has sufficiently compressed its load of gathered canes against the abutment at the end of the boom frame, the "loading drum" will slip on its clutch shoes and the liability of crushing and bruising the cane is obviated. The same is true of the "restoring drum" in case the operator fails to throw off the clutch when the gathering fork has been brought back against the stops at the inner end of the boom frame.

The operation of the machine is simple and it is readily controlled by a single operator through a pair of levers within convenient reach of the operator's hands and a lever to be manipulated by his foot. Should the furrow be irregular or crooked, or the platform out of line with the furrow, the boom may be swung in line with the furrow by releasing the latch-bolt which engages the bar 87 forming a part of the sprocket chain 79, and manipulating a suitable hand-wheel or lever on the shaft 81. So, too, when it is desired to transport the machine from place to place and the boom has been raised, and, of course, swung laterally simultaneously with the raising thereof, the boom may be swung around again parallel with the side of the carriage frame by releasing the latch-bolt from the bar 87 and turning the shaft 81 until the proper perforation 92 in the bar 87 is in position to be engaged by said latch-bolt, this being accomplished without disturbing the hoisting mechanism.

While the machine has been described in connection with the harvesting of canes and stalks, obviously it may be employed in gathering straw, hay and the like. Therefore, I do not wish to be limited to the gathering and loading of any particular stuff. Nor do I wish to be limited to the specific construction and arrangement shown, as it is obvious that the machine admits of considerable modification without departing from my invention.

What I claim is:

1. A loading machine of the class described, comprising a portable carriage and an elongated frame movably mounted on said carriage at the front end thereof, means for supporting said frame substantially in horizontal position in proximity to the ground, a gathering device comprising a carriage mounted on said elongated frame and adapted to travel lengthwise thereof, a fork pivotally mounted on said carriage and extending forwardly under said frame, means for releasably holding said fork in gathering position on said carriage, means for moving said carriage on said frame, and an abutment depending from the outer end of said frame in coöperative relation to said gathering device.

2. A loading machine of the class described, comprising a portable carriage and an elongated frame movably mounted on said carriage at the front end thereof, means for supporting said frame substantially in horizontal position in proximity to the ground, a gathering device comprising a carriage mounted on said elongated frame and adapted to travel lengthwise thereof, a fork pivotally mounted on said carriage and extending forwardly under said frame, means for releasably holding said fork in gathering position on said carriage, means for moving said carriage on said frame, an abutment depending from the outer end of said frame in coöperative relation to said gathering fork, means for raising and lowering said elongated frame, and means for tripping said releasable holding means to dump said gathering fork.

3. In a loading machine of the class described, a boom frame pivoted to swing vertically, an abutment at the outer end of said boom frame, a carriage mounted on said boom frame and movable lengthwise thereof, a fork pivotally mounted on said carriage and extending forwardly under said boom frame, means for releasably holding the gathering device in gathering position, means for tripping said releasable holding means to dump the fork, and means for supporting said boom frame so that said abutment is close to the ground and said gathering fork travels close to the ground toward the abutment.

4. In a loading machine of the class described, a boom frame pivoted to swing vertically and laterally, an abutment at the outer end of said boom frame, a gathering fork pivotally mounted on said boom frame and movable lengthwise thereof, the prongs of said fork extending forwardly under said boom frame, means for releasably holding said gathering fork in gathering position, means for moving said gathering fork toward said abutment, means for dumping the gathering fork and restoring it to normal position, means for raising and lowering said boom frame, and means for swinging said boom frame laterally.

5. In a loading machine of the class described, a boom frame pivoted to swing vertically and laterally, an abutment at the outer end of said boom frame, a gathering device pivotally mounted on said boom frame and movable lengthwise thereof, means for releasably holding said gathering device in gathering position, means for moving said gathering device toward said abutment, means for dumping the gathering device and restoring it to normal position, means for raising and lowering said boom frame, and automatic means for swinging said boom frame laterally simultaneous with the raising and lowering movements thereof.

6. In a loading machine of the class described, a portable carriage, a boom frame pivoted on said carriage at the front end thereof so as to swing vertically and laterally, an abutment at the outer end of said boom frame, means for raising and lowering said boom frame and for supporting it in substantially horizontal position in proximity to the ground, a gathering fork pivotally mounted on said boom frame and movable lengthwise thereof, the prongs of said fork extending forwardly and adapted to travel close to the ground in the lowered position of said boom frame, means for releasably holding said fork in gathering position on the boom frame, means for moving the fork on the boom frame toward said abutment, automatic means for swinging the boom frame laterally simultaneous with the raising and lowering movements thereof, and means for dumping said fork.

7. In a loading machine of the class described, a portable carriage, a boom frame pivoted to swing vertically and laterally on said carriage at the front end thereof, an abutment at the outer end of said boom frame, means for raising and lowering said boom frame and for supporting it in substantially horizontal position in proximity to the ground, a gathering fork pivotally mounted on said boom frame and movable lengthwise thereof, a device for releasably holding said gathering fork in gathering position, means for moving the fork on said frame toward said abutment, means for tripping the releasable holding device for said fork and for restoring the fork to normal position, means for causing the boom frame to swing laterally simultaneous with the raising and lowering movements thereof, a power shaft common to all of said actuating means and the connection between said power shaft and the respective actuating means being adapted to yield when the respective devices actuated thereby meet resistance beyond a certain degree.

8. A loading machine comprising a portable carriage, a horizontally swiveled supporting frame thereon, means on said carriage for rotating said swiveled frame, a boom frame pivoted to swing vertically on said swiveled frame, said boom frame being normally in front of said carriage, a rope fastened to said boom frame and a winding drum on said carriage whereby the boom frame may be raised and lowered, means for holding said drum so that said boom frame may be held in raised and lowered positions, a working connection between said winding drum and said means for rotating the swiveled frame whereby the boom is swung laterally and simultaneous with the raising and lowering movements thereof, an abutment depending from the outer end of said boom frame, a gathering fork pivotally mounted on said boom frame and movable lengthwise thereof, a device for releasably holding said gathering fork in gathering position on said boom frame, a rope secured to said releasable holding device for the gathering fork and to a winding drum on said carriage whereby said gathering fork may be dumped and drawn toward the inner end of said boom frame, a rope secured to said gathering fork and to a drum on said carriage whereby said fork may be drawn toward the outer end of said boom frame, all of said drums being loosely mounted on a common driving shaft, a separate clutch for each of said drums, a separate brake for each of said drums, said brakes being normally applied, a controlling device for said first mentioned drum adapted to throw the brake off and the clutch into engagement with the drum, and a controlling device common to both of said second and last mentioned drums, said controlling device being adapted to throw either of the clutches into engagement with its coöperating drum and simultaneously release the brake from both of the drums.

9. A loading machine comprising a portable carriage, a horizontally swiveled supporting frame thereon, means on said carriage for rotating said swiveled frame, a boom frame pivoted to swing vertically on said swiveled frame, said boom frame being normally in front of said carriage, a rope fastened to said boom frame and a winding drum on said carriage whereby the boom frame may be raised and lowered, means for holding said drum so that said boom frame may be held in raised and lowered positions, a working connection between said drum and said means for rotating the swiveled frame whereby the boom is swung laterally simultaneous with the raising and lowering movements thereof, an abutment depending from the outer end of said boom frame, a gathering fork pivotally mounted on said boom frame and movable lengthwise thereof, a device for releasably holding said gathering fork in gathering position on said boom frame, a rope secured to said releasable holding device for the gathering fork and to a winding drum on said carriage whereby said gathering fork may be dumped and drawn toward the inner end of said boom frame, a rope secured to said gathering fork and to a drum on said carriage whereby said fork may be drawn toward the outer end of said boom frame, all of said drums being loosely mounted on a common driving shaft, a separate clutch for each of said drums, said clutches each comprising a clutch sleeve feather-keyed to said driving shaft, clutch shoes rotatable in fixed relation to said driving shaft and adapted to engage the respective drums, adjustable connections between said clutch sleeves and said clutch shoes whereby said shoes may be made to engage the drums under various pressures, shifting levers for the respective clutch sleeves, a controlling device for the first mentioned drum, said controlling device comprising a rock-shaft having an operating lever fixed thereon, a cam sector fixed on said rock-shaft and adapted to engage the shifting lever for the clutch of said drum, said cam sector being so arranged that when the said operating lever is moved in one direction the clutch is thrown into engagement with the drum, a controlling device common to said second and last mentioned drums, said controlling device comprising a rock-shaft having an operating lever fixed thereon, and separate cam sectors fixed on said rock-shaft in coöperative relation to the shifting levers of the respective clutches for said two drums, said cam sectors being reversely arranged and adapted to throw the clutch of one of said drums into engagement therewith when the operating lever is moved in one direction and being also adapted to throw the clutch of the opposite drum into engagement therewith when it is moved in the opposite direction, all of said cam sectors being arranged and adapted to hold said clutches out of engagement with the respective drums when the operating levers are in neutral position, a separate brake for each of said drums, said brakes being provided with operating levers and tending to normally move from engagement with the respective drums, and cam sectors fixed on said controlling rockshafts and adapted to actuate the respective levers of said brakes to set them when the operating handles are moved in neutral position.

10. In a loading machine, a portable carriage, a horizontally swiveled supporting frame thereon, a boom frame pivoted to swing vertically on said swiveled frame, means for rotating said swiveled frame comprising a sprocket wheel on said swiveled frame, a second sprocket wheel on said portable carriage, a sprocket chain belted around said sprocket wheels, an oscillatory member mounted on said portable carriage and connected at its free end to said sprocket chain, means for actuating said oscillatory member, and means for raising and lowering said boom frame simultaneous with the actuation of the oscillatory member.

11. In a loading machine, a portable carriage, a horizontally swiveled supporting frame thereon, a boom frame pivoted to swing vertically on said swiveled frame, means for rotating said swiveled frame comprising a sprocket wheel on said swiveled frame, a second sprocket wheel on said portable carriage, a sprocket chain belted around said sprocket wheels, a cam lever pivoted to swing horizontally on said portable carriage and connected to said sprocket chain, a reciprocatory member mounted on said portable carriage in coöperative relation to said cam lever and adapted to effect an oscillation of the latter whereby said swiveled frame is rotated, and means for raising and lowering said boom frame simultaneous with the rotation of said swiveled frame.

12. In a loading machine, a portable carriage, a horizontally swiveled supporting frame thereon, a boom frame pivoted to swing vertically on said swiveled frame, means for rotating said swiveled frame comprising a sprocket wheel on said swiveled frame, a second sprocket wheel on said portable carriage, a sprocket chain belted around said sprocket wheels, a cam lever pivoted to swing horizontally on said portable carriage and connected to said sprocket chain, a reciprocatory member mounted on said portable carriage in coöperative relation to said cam lever and adapted to effect an oscillation of the latter whereby said swiveled frame is rotated, means for raising and lowering said boom frame simultaneous with the rotation of said swiveled frame, means for disconnecting said cam lever from said sprocket chain, and means for effecting the rotation of said swiveled frame independent of said cam lever.

13. In a loading machine, a portable carriage, a horizontally swiveled supporting frame thereon, a boom frame pivoted to swing vertically on said swiveled frame, an abutment at the outer end of said boom frame, a gathering device movable longitudinally on said boom frame at the under side thereof, means for moving said gathering device forwardly on said boom frame, means for dumping said gathering device, means for moving it rearwardly on said boom frame, means for rotating said swiveled frame comprising a sprocket wheel thereon, a second sprocket wheel on the portable carriage, a sprocket chain belted around said sprocket wheels, an oscillatory member mounted on said portable carriage and connected to said sprocket chain, means for actuating said oscillatory member to effect the rotation of said swiveled frame, and means for raising and lowering said boom frame simultaneous with the rotation of the swiveled frame.

14. In a loading machine, a portable carriage, a horizontally swiveled supporting frame thereon, a boom frame pivoted to swing vertically on said swiveled frame, an abutment at the outer end of said boom frame, a gathering device movable longitudinally on said boom frame, at the under side thereof, means for moving said gathering device forwardly on said boom frame, means for dumping said gathering device, means for moving it rearwardly on said boom frame, means for rotating said swiveled frame comprising a sprocket wheel thereon, a second sprocket wheel on the portable carriage, a sprocket chain belted around said sprocket wheels, an oscillatory member mounted on said portable carriage and connected to said sprocket chain, means for actuating said oscillatory member to effect the rotation of said swiveled frame, means for raising and lowering said boom frame simultaneous with the rotation of the swiveled frame, means for disconnecting said oscillatory member from said sprocket chain, and means for rotating said swiveled frame independent of said oscillatory member and its actuating means.

15. In a loading machine, a portable carriage, a horizontally swiveled supporting frame thereon, a boom frame pivoted to swing vertically on said swiveled frame, means for rotating said swiveled frame comprising a sprocket wheel fixed thereon and concentric with the axis thereof, a second sprocket wheel fixed on a shaft journaled on said portable carriage, a sprocket chain belted around said sprocket wheels, said sprocket chain extending substantially parallel with the side of the portable carriage, an oscillatory member pivoted on said portable carriage to swing in a horizontal plane and extending transversely of the carriage, said oscillatory member having a cam slot therein, a reciprocatory member mounted on transversely extending trackways on said portable carriage in coöperative relation to said oscillatory member and having a projection working in the cam slot whereby, when said reciprocatory member is reciprocated said oscillatory member is oscillated, means for actuating said reciprocatory member, and means for connecting the free end of said oscillatory member with said sprocket chain.

16. In a loading machine, a portable carriage, a horizontally swiveled supporting frame thereon, a boom frame pivoted to swing vertically on said swiveled frame, means for rotating said swiveled frame comprising a sprocket wheel fixed thereon and concentric with the axis thereof, a second sprocket wheel fixed on a shaft journaled on said portable carriage, a sprocket chain belted around said sprocket wheels, said sprocket chain extending substantially parallel with the side of the portable carriage, an oscillatory member pivoted on said portable carriage to swing in a horizontal plane and extending transversely of the carriage, said oscillatory member having a longitudinally extending cam slot therein, a reciprocatory member mounted on transversely extending trackways on said portable carriage in coöperative relation to said oscillatory member and having a projection working in the cam slot whereby, when said reciprocatory member is reciprocated said oscillatory member is oscillated, means for actuating said reciprocatory member, and means for releasably connecting the free end of said oscillatory member to said sprocket chain whereby the swiveled frame may be rotated independent of the oscillatory member and its actuating means.

17. In a loading machine, a portable carriage, a horizontally swiveled supporting frame thereon, a boom frame pivoted to swing vertically on said swiveled frame, means for raising and lowering said boom frame comprising a rope operatively connected to said boom frame and to a winding drum on said portable carriage, means for rotating said swiveled frame comprising a sprocket wheel fixed thereon concentric with the axis thereof, a second sprocket wheel on said portable carriage, a sprocket chain belted around said sprocket wheels, an oscillatory member pivoted on said portable carriage to swing in a horizontal plane and connected at its free end to said sprocket chain, said oscillatory member having a cam portion, a reciprocatory member on said portable carriage adapted to coöperate with the cam portion of said oscillatory member, means for actuating said reciprocatory member, said means being connected with said winding drum on the portable carriage so as to receive its motion therefrom and whereby, when said winding drum is actuated to wind its rope thereon to effect the raising of the boom frame, said reciprocatory and oscillatory members are simultaneously moved in a direction to rotate the swiveled supporting frame, and when said winding drum is unwinding its rope said reciprocatory and oscillatory members are moved in the opposite direction to effect the reverse rotation of said swiveled supporting frame.

18. In a loading machine, a portable carriage, a horizontally swiveled supporting frame thereon, a boom frame pivoted to swing vertically on said swiveled frame, means for raising and lowering said boom frame comprising a continuously rotating power shaft, a winding drum mounted loosely on said power shaft, a rope connected to said winding drum and to said boom frame, a clutch for connecting said winding drum with said power shaft, means for rotating said swiveled supporting frame comprising a sprocket wheel fixed thereon concentric with the axis thereof, a second sprocket wheel on said portable carriage, a sprocket chain belted around said sprocket wheels, an oscillatory member pivoted on said portable carriage and connected to said sprocket chain, said oscillatory member having a cam portion, a reciprocatory member on said portable carriage adapted to coöperate with the cam portion of said oscillatory member, and means for actuating said reciprocatory member comprising a sprocket chain connected at its opposite ends to said reciprocatory member and belted around oppositely disposed sprocket wheels, one of said sprocket wheels being fixed on a driving shaft, a spiral gear fixed on said driving shaft and meshing with a second spiral gear fixed axially with respect to said winding drum whereby, when said winding drum is clutched to the power shaft to effect the raising of the boom frame, said reciprocatory member is moved in a direction to actuate said oscillatory member to effect the rotation of said swiveled supporting frame, and when said winding drum is unclutched from said power shaft and is reversely rotated by the unwinding of the rope therefrom due to weight of the boom frame, the reciprocatory member is moved in an opposite direction to shift the oscillatory member and effect a reverse rotation of said swiveled supporting frame.

19. In a loading machine, a portable carriage, a horizontally swiveled supporting frame thereon, a boom frame pivotally supported on said swiveled supporting frame and adjustable vertically thereon, an abutment at the outer end of said boom frame, said abutment being adjustable and extending substantially at right angles to the boom frame from the under side thereof, a gathering fork mounted on said boom frame and adapted to be moved lengthwise thereon, the prongs of said fork extending downwardly and forwardly, means for supporting said boom frame in substantially horizontal position with the abutment and the prongs of said gathering fork close to the ground, and means for moving said gathering fork forwardly on the boom frame.

20. In a loading machine, a horizontally swiveled supporting frame comprising top and bottom cross members and parallel vertical members, a cross member slidably mounted on said vertical frame members, means for holding said slidably mounted cross member at different elevations on said vertical members, a boom frame pivotally mounted on said slidably mounted cross member, said boom frame comprising parallel channeled side members whose flanges are disposed inwardly, an abutment at the outer end of said boom frame, and a gathering fork comprising a carriage slidably mounted on the channeled side members of said boom frame, a member pivotally mounted on said carriage, prongs extending downwardly and forwardly from said pivotal member, prongs extending forwardly from the top portion of said pivotal member substantially parallel with said first mentioned fork prongs, and means for releasably holding said pivotal member so that the prongs of said gathering fork are normally substantially parallel with the channeled side members of said boom frame.

21. In a loading machine, a horizontally swiveled supporting frame comprising top and bottom cross members and parallel vertical members, a cross member slidably mounted on said vertical frame members, means for holding said slidably mounted cross member at different elevations on said vertical members, a boom frame pivotally mounted on said slidably mounted cross member, said boom frame comprising parallel channeled side members whose flanges are disposed inwardly, an abutment at the outer end of said boom frame, a gathering fork comprising a carriage slidably mounted on the channeled side members of said boom frame, a member pivotally mounted on said carriage, prongs extending downwardly and forwardly from said pivotal member, prongs extending forwardly from the top portion of said pivotal member substantially parallel with said first mentioned fork prongs, means for releasably holding said pivotal member so that the prongs of said gathering fork are normally substantially parallel with the channeled side members of said boom frame, means for moving said gathering fork forwardly on the boom frame, means for tripping the releasable holding means to dump said gathering fork, means for moving the gathering fork rearwardly on said boom frame, and means for restoring said gathering fork to gathering position on said boom frame comprising rollers projecting rearwardly on said gathering fork and cam tracks on said boom frame adapted to be engaged by said rollers as the gathering fork is moved to normal inward position on the boom frame.

22. In a loading machine, a boom frame, a gathering fork mounted to move longitudinally on said boom frame, means for moving said gathering fork forwardly on said boom frame, means for moving the fork rearwardly on said boom frame, and a resilient stop adjacent to the rear end of said boom frame adapted to arrest said gathering fork at the end of its rearward travel.

23. In a loading machine, a boom frame, a gathering fork pivotally mounted on said boom frame and adapted to be moved longitudinally thereon, means for moving said gathering fork forwardly, means for dumping said gathering fork, means for moving said gathering fork rearwardly, and means for restoring said gathering fork to gathering position on the boom frame, said means comprising a cam track near the inner end of said boom frame and means on said gathering fork adapted to coöperate with said cam track as the gathering fork approaches its normal position.

24. In a loading machine, a boom frame, a gathering fork pivotally mounted on said boom frame and adapted to be moved longitudinally thereon, means for moving said gathering fork forwardly, means for dumping said gathering fork, means for moving said gathering fork rearwardly, means for restoring said gathering fork to gathering position on the boom frame, said means comprising a cam track near the inner end of said boom frame and means on said gathering fork adapted to coöperate with said cam track as the gathering fork approaches its normal position, and a resilient stop on said boom frame located adjacent to said cam track and adapted to be engaged by the means on said gathering fork which coöperates with the cam track.

25. In a loading machine, a portable carriage, a horizontally swiveled supporting frame thereon, a boom frame pivoted to swing vertically on said swiveled supporting frame, means for raising and lowering said boom frame comprising a power shaft on said portable carriage, a winding drum mounted loosely on said power shaft, a rope connected to said drum and to said boom frame, a clutch for connecting said drum to rotate with said power shaft whereby the drum may be rotated to wind the rope thereon and hoist said boom frame, and when said clutch is released the boom frame falls by its own weight, a brake for said winding drum, a single controlling lever adapted to actuate both the brake and the clutch and being so arranged that when the clutch is thrown on, the brake is simultaneously thrown off, and vice versa, and being also arranged to throw the brake off while the clutch is off, means for rotating said swiveled supporting frame comprising an oscillatory member on said portable carriage, an operative connection between said oscillatory member and said swiveled frame, a reciprocatory member mounted on said carriage in coöperative relation to said oscillatory member so as to impart motion thereto, and means for actuating said reciprocatory member, said means comprising a sprocket chain secured at its opposite ends to said reciprocatory member and being belted around two oppositely disposed sprocket wheels, one of said sprocket wheels being fixed on a driving shaft, a spiral gear fixed on said driving shaft and meshing with a second spiral gear fixed axially with respect to said winding drum so as to rotate therewith.

26. In a loading machine, a portable carriage, a boom frame pivoted to swing vertically and laterally thereon, a gathering device mounted on said boom frame and movable lengthwise thereof, means for actuating said gathering device, means for raising and lowering said boom frame, and means connected to said raising and lowering means for swinging said boom frame laterally, said means being ineffective until the boom frame has been raised to a certain height and adapted to swing the boom frame laterally simultaneous with the continued raising movement thereof.

27. In a loading machine, a boom frame pivoted to swing vertically and laterally thereon, means for raising and lowering said boom frame, and automatic means for swinging said boom frame laterally simultaneous with the raising and lowering action thereof, said last mentioned means being ineffective until said boom frame is moved vertically above a certain height.

28. In a loading machine, a boom frame pivoted to swing vertically and laterally thereon, a gathering device mounted on said boom frame and movable lengthwise thereof, means for actuating said gathering device, means for raising and lowering said boom frame, and automatic means for swinging said boom frame laterally simultaneous with the raising and lowering thereof, said last mentioned means being operatively connected to said raising and lowering means and timed with respect thereto so that it is effective only during the vertical movement of said boom frame above a certain height.

Signed at St. Louis, Missouri, this 15th day of May, 1911.

WILLIAM C. ZELLE.

Witnesses:
G. A. PENNINGTON,
PAULINE AMBERG.